United States Patent
Lloyd

(10) Patent No.: US 11,102,091 B2
(45) Date of Patent: Aug. 24, 2021

(54) ANALYZING SCADA SYSTEMS

(71) Applicant: SCHNEIDER ELECTRIC USA, INC., Palatine, IL (US)

(72) Inventor: Chad A. Lloyd, Old Hickory, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 174 days.

(21) Appl. No.: 14/763,670

(22) PCT Filed: Mar. 31, 2013

(86) PCT No.: PCT/US2013/034747
§ 371 (c)(1),
(2) Date: Jul. 27, 2015

(87) PCT Pub. No.: WO2014/163607
PCT Pub. Date: Oct. 9, 2014

(65) Prior Publication Data
US 2015/0365303 A1    Dec. 17, 2015

(51) Int. Cl.
*G06F 15/16* (2006.01)
*H04L 12/26* (2006.01)
*G06Q 10/06* (2012.01)

(52) U.S. Cl.
CPC ....... *H04L 43/04* (2013.01); *G06Q 10/06313* (2013.01); *H04L 43/06* (2013.01)

(58) Field of Classification Search
CPC ...................................................... H04L 43/04
USPC ....................................................... 709/224
See application file for complete search history.

(56) References Cited

U.S. PATENT DOCUMENTS

| | | |
|---|---|---|
| 4,924,434 A | 5/1990 | Christenson et al. |
| 7,418,733 B2 | 8/2008 | Connary et al. |
| 8,055,738 B2 | 11/2011 | Shah et al. |
| 8,060,259 B2 | 11/2011 | Budhraja et al. |

(Continued)

FOREIGN PATENT DOCUMENTS

WO    20090128905 A1    10/2009

OTHER PUBLICATIONS

Extended European Search Report from corresponding European Application No. 13881349.8 dated Sep. 22, 2016.
(Continued)

*Primary Examiner* — Kevin T Bates
*Assistant Examiner* — Clarence D McCray
(74) *Attorney, Agent, or Firm* — Lando & Anastasi, LLP

(57) ABSTRACT

At least one aspect disclosed herein is directed to a SCADA project analysis system. The system includes memory ad at least one processor coupled to memory. The processor is configured to receive information regarding a supervisory control and data acquisition (SCADA) system configured to monitor an industrial process, the information describing at least one first programmable device within the SCADA system, identify at least one analyzer from a plurality of analyzers based on the information, the at least one analyzer being configured to generate an assessment of the SCADA system based on the information, the assessment describing at least one capability of the SCADA system, execute the at least one analyzer to generate the assessment of the SCADA system based on the information, and provide the assessment to an external entity.

20 Claims, 4 Drawing Sheets

(56) References Cited

U.S. PATENT DOCUMENTS

| | | | |
|---|---|---|---|
| 8,244,499 B2 | 8/2012 | Lambie et al. | |
| 8,255,186 B2 | 8/2012 | Mukhi et al. | |
| 8,276,089 B1 | 9/2012 | Jaramillo et al. | |
| 8,356,353 B2 | 1/2013 | Futoransky et al. | |
| 8,909,926 B2 | 12/2014 | Brandt et al. | |
| 9,026,394 B2 | 5/2015 | Kube et al. | |
| 9,412,073 B2 | 8/2016 | Brandt et al. | |
| 2002/0022969 A1* | 2/2002 | Berg | G06Q 10/06 705/305 |
| 2004/0073662 A1 | 4/2004 | Falkenthros | |
| 2004/0260404 A1* | 12/2004 | Russell | G05B 19/41855 700/1 |
| 2007/0250217 A1* | 10/2007 | Yoon | H02J 13/00002 700/286 |
| 2009/0007270 A1 | 1/2009 | Futoransky et al. | |
| 2010/0050017 A1* | 2/2010 | Almadi | E21B 47/12 714/15 |
| 2010/0082177 A1* | 4/2010 | Chang | H02J 3/1814 700/298 |
| 2010/0280872 A1* | 11/2010 | Scholte-Wassink | G06Q 10/06311 705/7.13 |
| 2011/0009984 A1* | 1/2011 | Mukhi | G05B 23/0267 700/83 |
| 2011/0039237 A1* | 2/2011 | Skare | G05B 23/0267 434/118 |
| 2011/0106317 A1 | 5/2011 | Kram et al. | |
| 2012/0173931 A1 | 7/2012 | Kube et al. | |
| 2012/0324353 A1 | 12/2012 | Torbey et al. | |
| 2013/0031037 A1* | 1/2013 | Brandt | H04L 63/1408 706/12 |
| 2013/0031340 A1* | 1/2013 | Carrara | H04L 41/0803 713/1 |
| 2015/0370235 A1 | 12/2015 | Lloyd et al. | |

OTHER PUBLICATIONS

International Search Report and Written Opinion from corresponding PCT Application Serial No. PCT/US2013/034747, dated Jul. 8, 2013.

U.S. Appl. No. 14/764,353, filed Jul. 29, 2015, Chad Andrew Lloyd et al.

* cited by examiner

ANALYZING SCADA SYSTEMS

RELATED APPLICATION

This application is a U.S. National Stage Application under 35 U.S.C. §371 of International Application No. PCT/US2013/034747, filed Mar. 31, 2013, which is hereby incorporated herein by reference in its entirety.

BACKGROUND

Field of Invention

At least some embodiments disclosed herein relate to systems and methods for analyzing supervisory control and data acquisition (SCADA) systems.

Discussion of Related Art

Supervisory control and data acquisition (SCADA) systems are computer controlled systems that monitor and control large-scale processes via one or more programmable devices. Such processes can include industrial processes, such as manufacturing, production, power generation, and fabrication. Industrial processes can also include infrastructure processes such as water treatment, electrical power transmission and distribution, and communication systems. Industrial processes can also include facility processes, such as heating, ventilation, and air conditioning (HVAC) systems, and energy consumption. SCADA systems can be customized based on various factors, such as type of processes, location, and scale.

SUMMARY

At least one aspect disclosed herein is directed to a SCADA project analysis system. The system includes memory and at least one processor coupled to memory. The processor is configured to receive information regarding a supervisory control and data acquisition (SCADA) system configured to monitor an industrial process, the information describing at least one first programmable device within the SCADA system, identify at least one analyzer from a plurality of analyzers based on the information, the at least one analyzer being configured to generate an assessment of the SCADA system based on the information, the assessment describing at least one capability of the SCADA system, execute the at least one analyzer to generate the assessment of the SCADA system based on the information, and provide the assessment to an external entity.

In some embodiments, the information is descriptive of a capacity of the at least one first programmable device and the at least one analyzer is further configured to generate an assessment descriptive of the capacity.

In some embodiments, the information is descriptive of at least one data point that the at least one first programmable device is configured to transmit and the at least one analyzer is further configured to generate an assessment descriptive of one or more data points not included in the at least one data point.

In some embodiments, the analyzer is further configured to generate an assessment descriptive of a history of values of the at least one data point that the system is configured to store. In some embodiments, the analyzer is further configured to generate an assessment descriptive of a configuration of the system capable of storing the history.

In some embodiments, the information is descriptive of instructions to be executed by the at least one first programmable device and the at least one analyzer is further configured to generate an assessment descriptive of the instructions. In some embodiments, the information is descriptive of executable content available to a user and the at least one analyzer is further configured to generate an assessment descriptive of security issues associated with the executable content.

In some embodiments, the information is descriptive of at least one user of the SCADA system and the at least one analyzer is further configured to generate an assessment descriptive of usability issues associated with the at least one user.

In some embodiments, the SCADA system includes at least one second programmable device within the SCADA system, the at least one second programmable device being separate and distinct from the at least one first programmable device; the information is descriptive of a level of redundancy between the at least one first programmable device and the at least one second programmable device; and the at least one analyzer is further configured to generate an assessment descriptive of the level of redundancy.

In some embodiments, the information is descriptive of non-executable content available to a user and the at least one analyzer is further configured to generate an assessment descriptive of the non-executable content.

In some embodiments, the information is descriptive of at least one alarm that the at least one first programmable device is configured to initiate and the at least one analyzer is further configured to generate an assessment descriptive of the at least one alarm.

In some embodiments, the at least one analyzer is further configured to generate an assessment descriptive of recommended alarms not included in the at least one alarm.

Aspects also include a method for analyzing a SCADA project. The method includes receiving information regarding the SCADA system configured to monitor an industrial process, the information describing at least one first programmable device within the SCADA system, identifying at least one analyzer from a plurality of analyzers based on the information, generating, with the at least one analyzer, an assessment of the SCADA system based on the information, the assessment describing at least one capability of the SCADA system, and providing the assessment to an external entity.

Aspects also include a non-transitory computer readable medium having stored thereon sequences of instruction for receiving information regarding the SCADA system configured to monitor an industrial process, the information describing at least one first programmable device within the SCADA system, identifying at least one analyzer from a plurality of analyzers based on the information, generating, with the at least one analyzer, an assessment of the SCADA system based on the information, the assessment describing at least one capability of the SCADA system, and providing the assessment to an external entity.

Still other aspects, examples, and advantages of these exemplary aspects and examples are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

In at least some aspects and embodiments disclosed herein, the system can allow a user to analyze a SCADA system. The SCADA system may include one or more programmable devices. These programmable devices may include a variety of pre-programmed or field programmable hardware and software components. In some embodiments, the SCADA system can be analyzed for various issues. For example, a configuration for the SCADA system can be implemented in a default environment. The configuration can also be tested for performance and errors. The SCADA system can also be validated for full functional compatibility of devices on the system. A document can be generated outlining the details of the configuration and the environment. Once the SCADA system is deployed in a customer environment, the SCADA system can be customized for the customer environment. A file can be generated that details the customized SCADA project in the customer environment. The file can be analyzed in a static setting for possible issues including performance, security, localization, maintainability, redundancy, and others.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
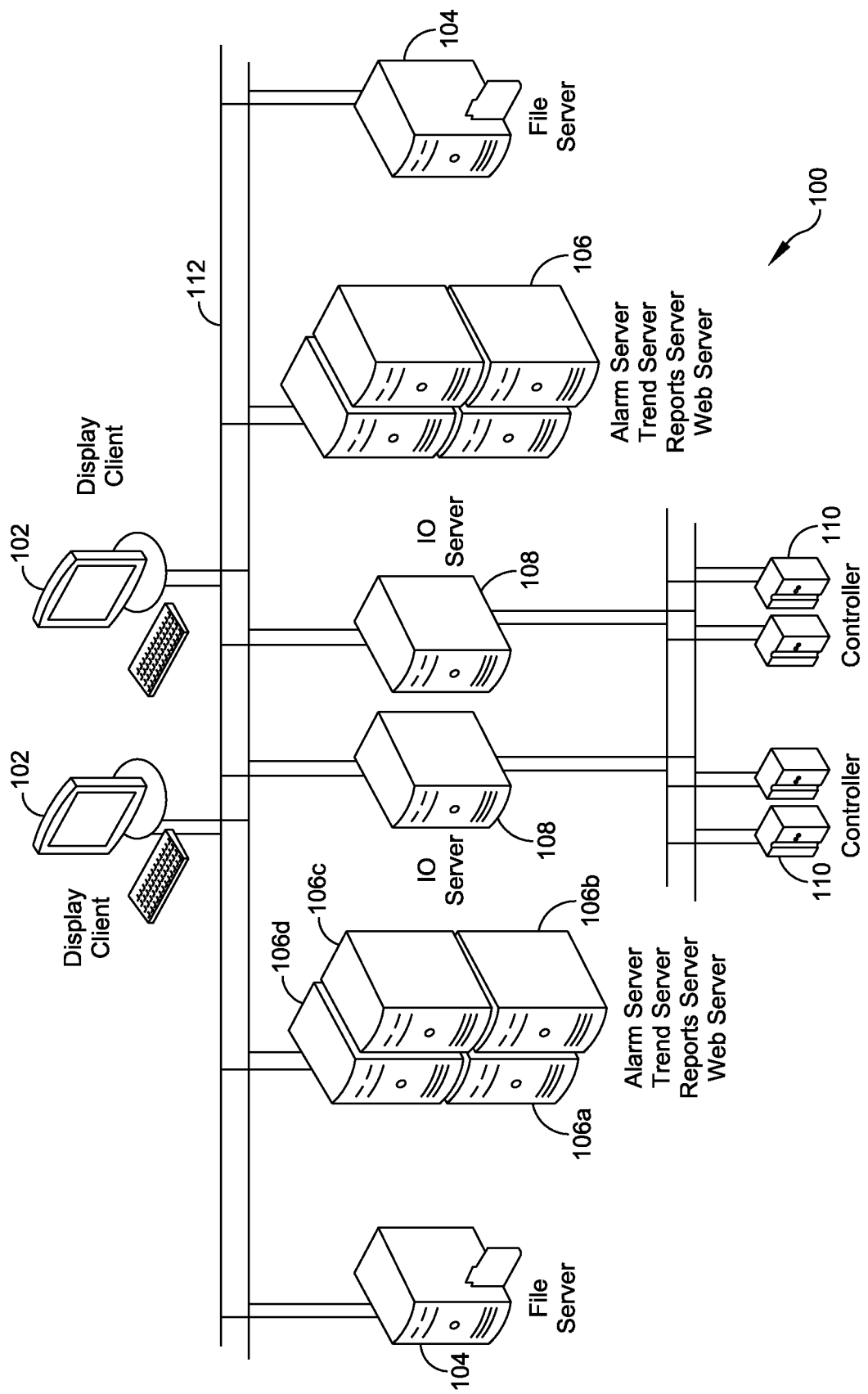
FIG. 1 is a block diagram of an example SCADA system according to aspects of some embodiments.

FIG. 1 shows an example SCADA system 100. In some embodiments, the SCADA system includes one more programmable device. For example, the SCADA system 100 includes one or more display clients 102, which can provide an interface for users to the SCADA system 100. The SCADA system 100 also includes one or more servers 104, 106, 108, which can include file servers, alarm servers, trend servers, report servers, web servers, and/or input/output (IO) servers. The SCADA system 100 also includes one or more controllers 110, which can monitor and provide instructions to devices, such as industrial process equipment. The display clients 102, servers 104, 106, 108, and the controllers 110 can be connected by a network 112. In some embodiments, the network 112 can include physical busses, an intranet, a local area network (LAN), a wide area network (WAN), wired and/or wireless connections (e.g., radio, satellite), and/or the Internet.

In some embodiments, the display clients 102 include a computing device, such as a computer, laptop, tablet computer, smartphone, mobile computing device, or other appropriate device including a processor. A user can use the display clients 102 to control and/or monitor the SCADA system and the industrial process monitored and controlled by the SCADA system. For example, the display clients 102 can include a client application that allows a user to provide commands to and receive data from the SCADA system. The client application can include various settings, for example, allowing a subset of users to provide commands and a subset of users to only monitor the SCADA system and the industrial process. In some embodiments, the display client 102 provides a web interface to the user, with the application running on a server separate from the display client 102, such as a web server 106. The application running on the web server 106 can provide an interface to the SCADA system similar to that of the client application, for example, including similar security settings.

In some embodiments, the servers include one or more file servers 104. The file servers 104 can include one or more databases to store data collected from the industrial process. For example, the file servers 104 can include a tag database, including data elements called tags. Tags can represent one or more input or output values monitored or controlled by the system, such as physical characteristics of the industrial process.

In some embodiments, the servers can also include one or more alarm servers 106a. The alarm servers 106a can process alarms received from controllers 110 or other components of the SCADA system 100. The alarm server 106a can also present the alarms to the display clients 102. For example, the SCADA system 100 can monitor whether predetermined alarm conditions are satisfied, to determine when an alarm event has occurred. If an alarm event is been detected, one or more actions can be taken (such as the activation of one or more alarm indicators, and/or the generation of email or other messages). In some embodiments, alarm indicators can remain active until the alarm is acknowledged by a user and/or the alarm conditions are cleared. Alarm conditions can include, for example, values of tags meeting a predetermine threshold. In some embodiments, alarms can be aggregated or otherwise processed prior to being presented to the user. For example, an alarm condition can initiate several other alarm conditions, resulting in a cascade of alarms. The alarms can be aggregated and presented as one alarm with an indication of the various alarm conditions associated with the alarm.

In some embodiments, the servers can also include one or more trend servers 106b. The trend servers 106b can analyze data to determine trends and present the trends to the display clients 102. For example, the trend servers 106b can analyze the data stored in the file servers 104 to determine patterns that can be used to adjust the system, for example, for greater performance and/or efficiency. For example, the trend servers 106b can determine that the monitored industrial process uses more power or less power at certain times of the day or in a regular pattern. The SCADA system 100 can use such a pattern to provide more or less power as appropriate, such as shutting down unused generators, to increase efficiency.

In some embodiments, the servers can also include one or more report servers 106c, which can generate reports to provide to the display clients 102. Reports can include information generated by the alarm servers 106a and trend servers 106b, as well as data from the file servers 104. The reports can be customized by the user to include information of interest to the user. The reports can be generated at a periodic interval, such as each day or other time, and/or on request by the user.

In some embodiments, the servers can also include one or more web servers 106d, which can generate and provide web pages for the display clients 102. The web servers 106d can run web applications that interface with the other servers and components of the SCADA system 100 to provide information to the display clients 102 and receive commands from the web clients 102 for the components.

In some embodiments, the servers can also include one or more IO servers 108. The IO servers 108 can receive data from devices, as well as alarm conditions. The IO servers 108 can also receive commands for the devices. The IO servers 108 can route the data and commands to appropriate destinations. In some embodiments, the IO servers 108 work as an interface between the display clients 102, the other servers, and the controllers 110.

In some embodiments, the SCADA system 100 also includes one or more controllers 110. The controllers 110 can include remote terminal units (RTUs), which can include and/or be connected to sensors in the industrial process. The sensors can monitor characteristics and parameters of the industrial process and provide sensor signals to the remote terminal units. The remote terminal units can convert the sensor signals into digital data and provide the information to the IO servers 108. The RTUs can also provide instructions to equipment in the industrial process. The controllers 110 can also include programmable logic controllers (PLCs), which can also receive information from sensors and provide instructions to equipment.

Each of the components of the SCADA system 100 can have settings which can be configured. For example, each of the servers 104, 106, 108 and display clients 102 can have operating systems configurations, such as firewall rules, running processes, file and process permission settings, and access control lists. While each of the servers in FIG. 1 is shown as a separate computing device, the functionality of the servers can be consolidated into fewer computing devices or further distributed among more computing devices. The servers can also include anti-virus and/or anti-malware applications. The types and number of controllers 110, sensors, equipment, servers, and display clients 102, included in the SCADA system 100 can also be a configurable setting. The configuration can also include historical logging configurations and external network device configurations (e.g., switches, routers, firewalls, additional devices connected to the network 112). The configuration can also include applications and versions of the applications running on the display clients 102 and servers 104, 106, 108. In some embodiments, the configuration includes a value for some or all of the settings that can be changed on some or all of the devices included in the SCADA system 100, including the number and types of the devices and software running on the devices.

Figure 2:
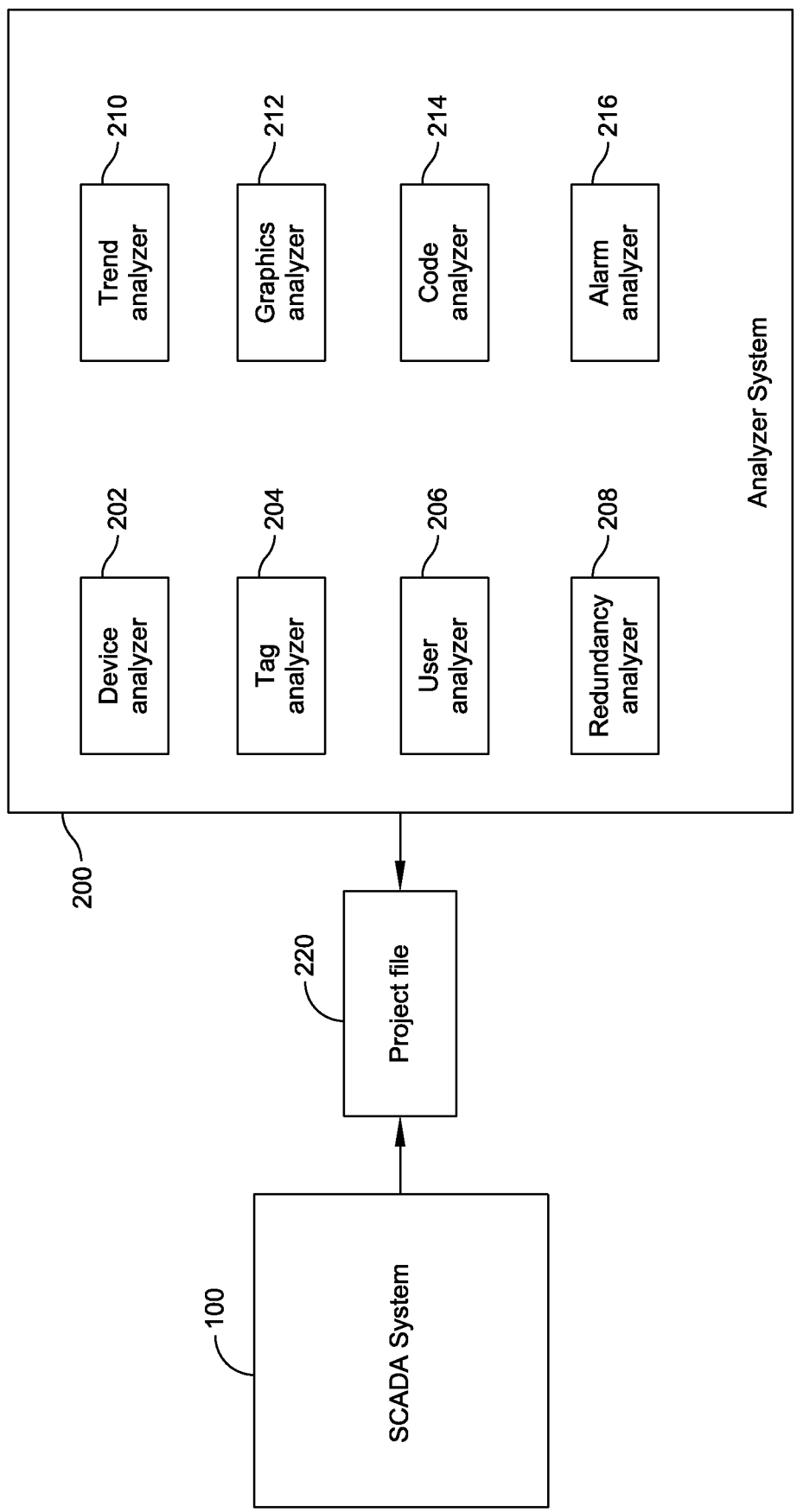
FIG. 2 is a block diagram of an example analyzer system according to aspects of some embodiments.

FIG. 2 is a block diagram of an example analyzer system 200. In some embodiments, a SCADA system, such as the example SCADA system 100 of FIG. 1 is used as a basis to generate a document, such as a project file 220 that details the SCADA system 100. The project file 220 can be used by an analyzer system 200 to provide a static analysis of potential issues of the SCADA system 100. In some embodiments, the analyzer system 200 can include a plurality of analyzer modules that analyze the SCADA system 100 for various potential issues. For example, the analyzer system 200 can include a device analyzer 202, a tag analyzer 204, a user analyzer 206, a redundancy analyzer 208, a trend analyzer 210, a graphics analyzer 212, a code analyzer 214, and an alarm analyzer 216, among other analyzers.

In some embodiments, the SCADA system 100 is deployed in a customer environment. The SCADA system 100 can be configured when deployed to adjust for differences in the customer environment and, for example, a staging environment, a development environment, or a default environment. The configuration can include design components of the architecture of the SCADA system 100, such as types and numbers of devices in the SCADA system 100 and software executed by the devices. The configuration can also include values for configurable settings for the hardware and software included in the devices, changes and/or additions to code running on the devices, and security modeling for the SCADA system 100. Such configurations can be created at the customer environment or prior to deployment at the customer environment, based on information about the customer environment.

In some embodiments, the configured SCADA system 100 can be used to generate the project file 220 (e.g., a backup file or a CTZ file). The project file 220 can include a description of the SCADA system 100, including the configurations made. The project file 220 can also include information about the customer environment. The customer environment can include, for example, a potential user base of the SCADA system 100.

In some embodiments, the analyzer system 200 uses the project file 220 to provide a static analysis of the SCADA system 100. The analyzer system 200 can include a plurality of analyzer modules to analyze various potential issues of the configured SCADA system 100 deployed in the customer environment or elsewhere. In some embodiments, the analyzer system 200 includes a device analyzer 202. The device analyzer 202 can determine types and names of the devices in the SCADA system 100. The device analyzer 202 can also analyze connection details between the devices. The device analyzer 202 can test for potential issues with the devices in the SCADA system 100 and any potential issues in potential interactions between the devices, such as ensuring proper connections and communication. For example, the device analyzer 202 can test to ensure each device has a sufficient capacity for each of the tasks assigned to the devices. Such tests can be based on a functional type of the device. For example, the device analyzer 202 can determine whether a computer has enough memory and/or processing power to handle functions to which the computer is assigned.

In some embodiments, the analyzer system 200 includes a tag analyzer 204. The tag analyzer 204 can assess tags, or data points, that are requested by the SCADA system 100, for example, ensuring that each of the tags is a valid, determinable data point. For example, some tags can be nested, such as analyzing other tags to generate an output. The tag analyzer 204 can assess the validity of such tags. The tag analyzer 204 can also ensure tags associated with an input or output of a sensor can receive or provide the appropriate information from the sensor. The tag analyzer 204 can also recommend tags based on the industrial process being monitored and controlled by the SCADA system 100. For example, the tag analyzer 204 can specify data inputs and outputs that are typically processed for specific industrial processes or specific types of industrial processes.

In some embodiments, the analyzer system 200 includes a user analyzer 206. The user analyzer 206 can assess user classes and potential security issues. For example, one user class can include users only allowed to read data and another user class can include users allowed to issue commands. The user analyzer 206 can ensure the correct access is available to each of the user classes. The default access levels and default user classes can be based on the industrial processes defined within a customer environment. The user analyzer 206 can also analyze code to find any potential security vulnerabilities, which can include unauthorized users class access as well as outside threats. The user analyzer 206 can also analyze a potential user base. For example, a user database can be provided that lists people at the customer environment that will be using the SCADA system 100. The user analyzer 206 can analyze characteristics of the users to generate suggested configurations. For example, the user database can include information descriptive of a primary language of each user, a primary culture of each user, disabilities of each user, and any other characteristics of each user that can affect the effectiveness of a user interface. In some embodiments, the user interface can be customized based on the characteristics of the users in the user database. For example, if the user base is based in a foreign country and made of a foreign population, the user analyzer 206 can ensure or suggest that any text provided to the users be provided in the foreign language. As another example, if a potential user of the SCADA system 100 is listed as colorblind, the user analyzer 206 can ensure or suggest that interfaces or graphics provided to the user or all the users be configured to accommodate colorblindness.

In some embodiments, the analyzer system 200 includes a redundancy analyzer 208. The redundancy analyzer 208 can assess the SCADA system 100 for redundancy at various levels of granularity. For example, the redundancy analyzer 208 can determine whether the SCADA system 100 could sustain one or more failures of devices (e.g. clients, servers, and the like), networks, and other components and subsets of components. The redundancy analyzer 208 can determine whether supported redundancy is implemented correctly and/or efficiently.

In some embodiments, the analyzer system 200 includes a trend analyzer 210. The trend analyzer 210 can determine what data is logged historically and for how long. The trend analyzer 210 can also specify hardware resources that would be used to support the specified logging configuration.

In some embodiments, the analyzer system 200 includes a graphics analyzer 212. The graphics analyzer 212 can check graphics for errors. The graphics analyzer 212 can also assess any interactive graphics for proper functionality. The graphics analyzer 212 can also receive information from the user analyzer 206 to provide graphics that are appropriate to the potential user base. For example, the graphics analyzer 212 can receive information from the user database to present graphics more suitable for each user.

In some embodiments, the analyzer system 200 includes a code analyzer 214. The code analyzer 214 can check the code, including configurations made to the code for errors and potential optimizations. The code analyzer 214 can also assess the code for potential security vulnerabilities.

In some embodiments, the analyzer system 200 includes an alarm analyzer 216. The alarm analyzer 216 can list the configured alarms and parameters associated with the configured alarms. The alarm analyzer 216 can also assess the SCADA system 100 for alternate and/or complementary alarms that could or should be implemented. In some embodiments, the alarm analyzer 216 can be used to help configure the alarms, for example, allowing the alarm analyzer 216 to provide recommendations for alarms based on the types of devices in the SCADA system 100.

Figure 3:
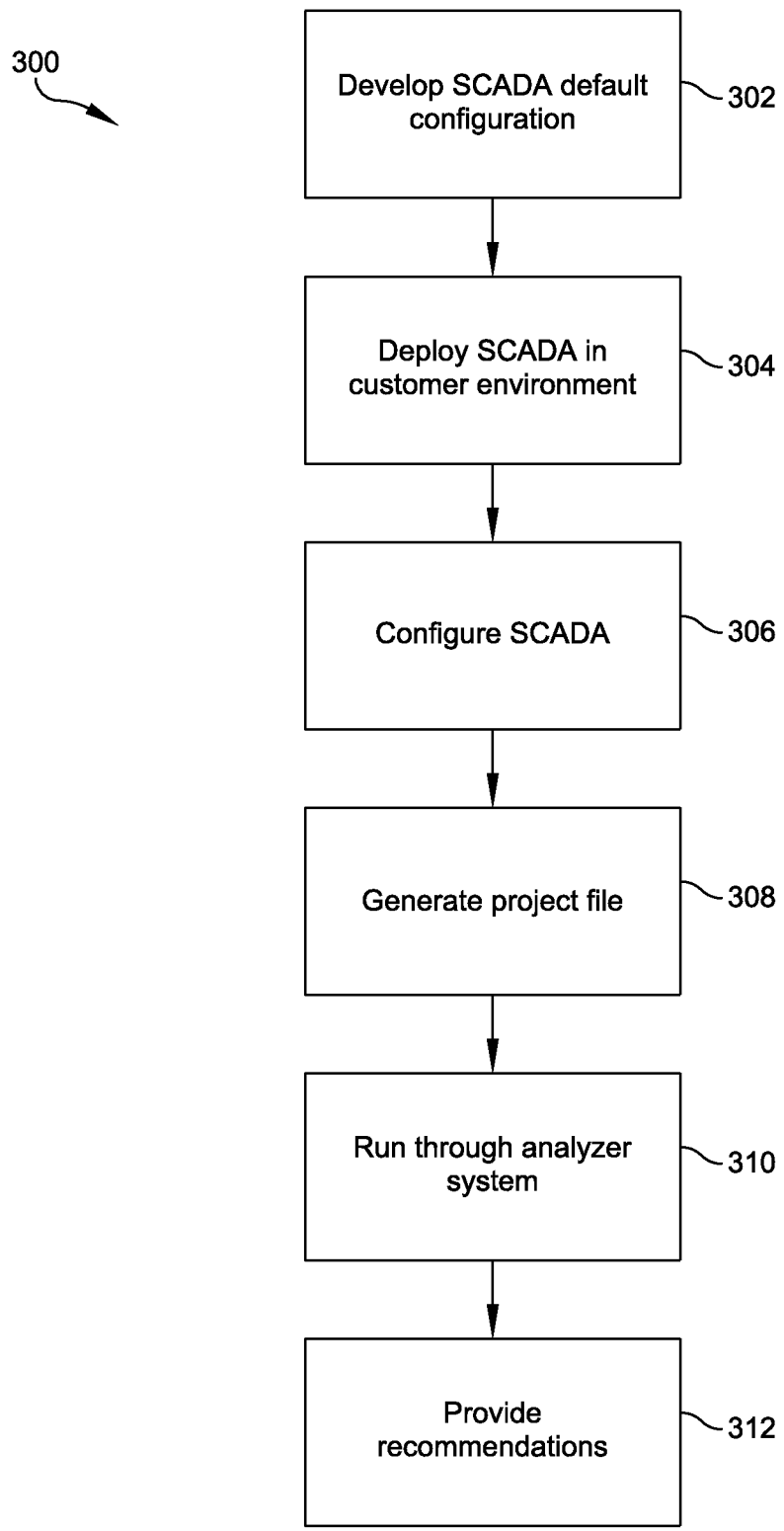
FIG. 3 is a flow chart of an example process according to aspects of some embodiments.

FIG. 3 shows an example process 300 using the analyzer system 200. At act 302, a default configuration of the SCADA system 100 is developed. The default configuration can be, for example, a tested configuration on a default environment. At act 304, the SCADA system 100 is deployed in a customer environment. The customer environment can be different from the default environment in various ways. For example, the customer environment can be at a different location, have a different size and/or scale of system, have different types and/or numbers of devices available, have different network configurations, security configurations, different user base, and have various other factors that can be different from the default environment.

At act 306, the SCADA system 100 can be configured to suit the differences in the customer environment and the default environment. For example, values of configuration settings can be changed. Code on servers and devices of the SCADA system 100 can be changed and/or added to. Various other configurations can be made so the SCADA system 100 is more suited for the customer environment.

At act 308, a project file is generated. The project file can be a file used to restore the SCADA system 100 if such a restoration would be desired or necessary, i.e. the project file may act as a backup file. The project file can detail the configuration of the SCADA system 100. The configuration of the SCADA system 100 can include the changes made in configuring the SCADA system 100 to the customer environment, for example, including settings and code changes.

At act 310, the project file is run through the analyzer system 200. In some embodiments, the project file can be run through the analyzer system 200 over a network, such as the internet. In some embodiments, the analyzer system 200 can include a computer implementing the analyzer modules that is brought to the customer environment to analyze the project file. In some embodiments, certain analyzer modules of the analyzer system 200 can be used to analyze the project file. For example, a tester may know that the code has not been changed, and thus elect to skip the code analyzer. In some embodiments, the analyzers can be standalone modules that can be installed into the SCADA system 100 to analyze the SCADA system 100.

At act 312, recommendations are provided by the analyzer system 200. The recommendations can be based on issues discovered by the analyzer system 200. For example, the recommendations can improve and/or fix potential security issues, performance issues, scalability issues, maintainability issues, localization issues, and other such issues. The recommendations can include, for example, recommended code changes, re-architecture of connected devices, reconfigurations of settings, additional equipment implementations, and other such appropriate recommendations.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 4:
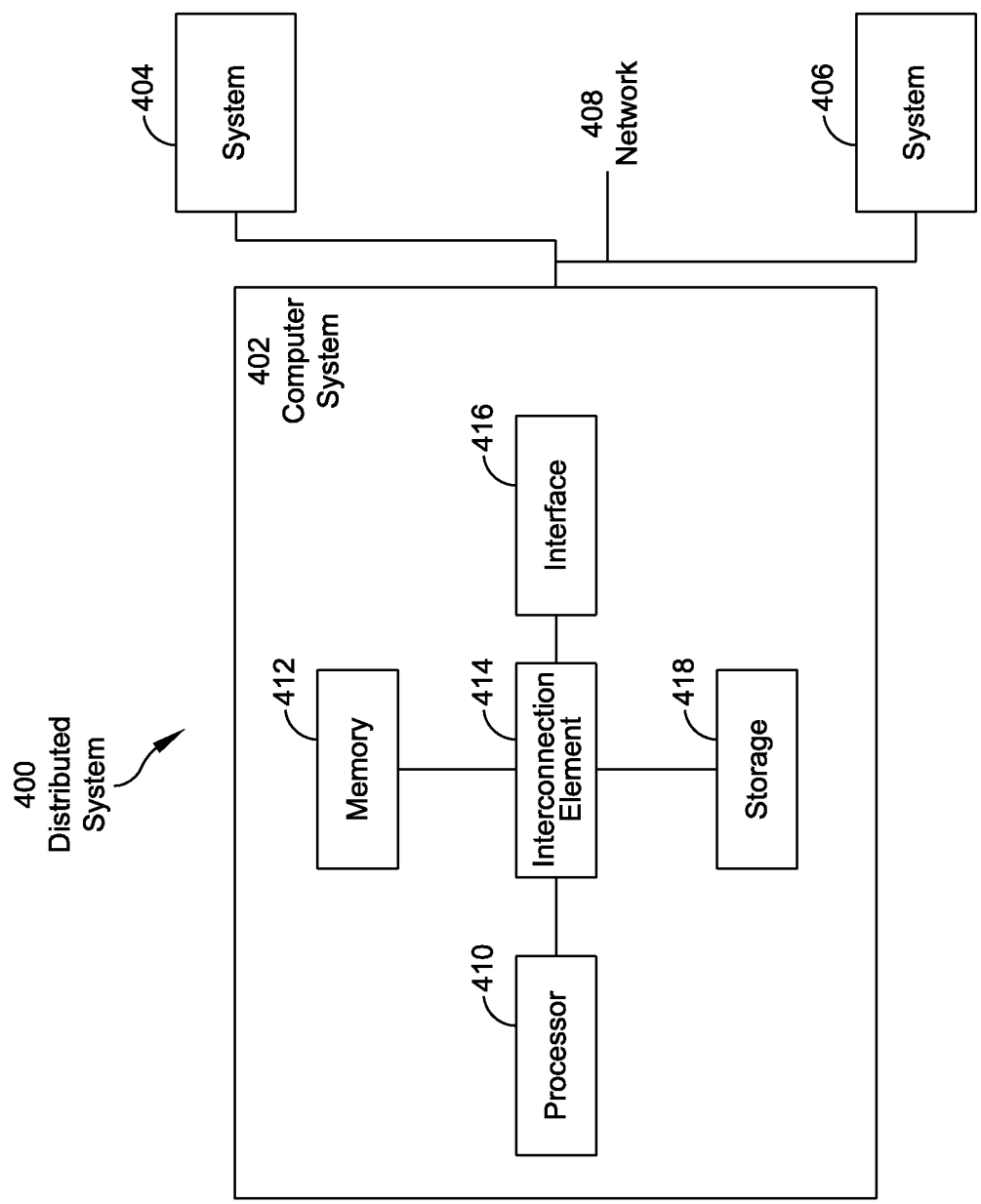
FIG. 4 is a schematic diagram of an example of a computer system that may perform processes and functions disclosed herein.

Referring to FIG. 4, there is illustrated a block diagram of a distributed computer system 400, in which various aspects and functions are practiced. As shown, the distributed computer system 400 includes one more computer systems that exchange information. More specifically, the distributed computer system 400 includes computer systems 402, 404 and 406. As shown, the computer systems 402, 404 and 406 are interconnected by, and may exchange data through, a communication network 408. The network 408 may include any communication network through which computer systems may exchange data. To exchange data using the network 408, the computer systems 402, 404 and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 402, 404 and 406 may transmit data via the network 408 using a variety of security measures including, for example, TLS, SSL or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, an interconnection element 414, an interface 416 and data storage 418. To implement at least some of the aspects, functions and processes disclosed herein, the processor 410 performs a series of instructions that result in manipulated data. The processor 410 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 410 is connected to other system components, including one or more memory devices 412, by the interconnection element 414.

The memory 412 stores programs and data during operation of the computer system 402. Thus, the memory 412 may be a relatively high performance, volatile, random access memory such as a dynamic random access memory (DRAM) or static memory (SRAM). However, the memory 412 may include any device for storing data, such as a disk drive or other non-volatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the interconnection element 414. The interconnection element 414 may include one or more physical interconnection elements, for example, interconnection elements between components that are integrated within a same machine, but may include any communication coupling between system elements including specialized or standard computing interconnection element technologies such as IDE, SCSI, PCI and InfiniBand. The interconnection element 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage 418 includes a computer readable and writeable nonvolatile, or non-transitory, data storage medium in which instructions are stored that define a program or other object that is executed by the processor 410. The data storage 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage 418. The memory may be located in the data storage 418 or in the memory 412, however, the processor 410 manipulates the data within the memory, and then copies the data to the storage medium associated with the data storage 418 after processing is completed. The processor 410 can also manipulate the data and provide manipulated data to a user on a display and/or a communication interface. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having a different architectures or components than that shown in FIG. 4. For instance, the computer system 402 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters, such as sponsor types and sectors, and thereby configure the behavior of the components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
   a memory; and
   at least one processor coupled to the memory, the at least one processor being configured to:
   receive a project file describing a supervisory control and data acquisition (SCADA) system configured to monitor an industrial process, the project file describing at least one first programmable device within the SCADA system and at least one value for at least one configuration setting for the at least one first programmable device;
   identify at least one analyzer from a plurality of analyzers based on the project file, the at least one analyzer being configured to generate an assessment of the SCADA system based on the project file, the assessment describing at least one capability of the SCADA system;
   execute the at least one analyzer to generate the assessment of the SCADA system based on the project file; and
   provide the assessment to an external entity,
   wherein the at least one analyzer includes a device analyzer configured to determine if the at least one first programmable device has an available resource capacity to execute a task assigned to the at least one first programmable device.

2. The system according to claim 1, wherein the project file is descriptive of the available resource capacity of the at least one first programmable device and the at least one analyzer is further configured to generate an assessment descriptive of the available resource capacity.

3. The system according to claim 1, wherein the project file is descriptive of at least one data point that the at least one first programmable device is configured to transmit and the at least one analyzer is further configured to generate an assessment descriptive of one or more data points not included in the at least one data point.

4. The system according to claim 3, wherein the at least one analyzer is further configured to generate an assessment descriptive of a history of values of the at least one data point that the system is configured to store.

5. The system according to claim 4, wherein the at least one analyzer is further configured to generate an assessment descriptive of a configuration of the system capable of storing the history.

6. The system according to claim 1, wherein the project file is descriptive of instructions to be executed by the at least one first programmable device and the at least one analyzer is further configured to generate an assessment descriptive of the instructions.

7. The system according to claim 1, wherein the project file is descriptive of executable content available to a user and the at least one analyzer is further configured to generate an assessment descriptive of security issues associated with the executable content.

8. The system according to claim 1, wherein the project file is descriptive of at least one user of the SCADA system and the at least one analyzer is further configured to generate an assessment descriptive of usability issues associated with the at least one user.

9. The system according to claim 1, wherein the SCADA system includes:
at least one second programmable device within the SCADA system, the at least one second programmable device being separate and distinct from the at least one first programmable device,
wherein the project file is descriptive of a level of redundancy between the at least one first programmable device and the at least one second programmable device, and
wherein the at least one analyzer is further configured to generate an assessment descriptive of the level of redundancy.

10. The system according to claim 1, wherein the project file is descriptive of graphical content available to a user and the at least one analyzer is further configured to generate an assessment descriptive of the graphical content.

11. The system according to claim 1, wherein the project file is descriptive of at least one alarm that the at least one first programmable device is configured to initiate and the at least one analyzer is further configured to generate an assessment descriptive of the at least one alarm.

12. The system according to claim 11, wherein the at least one analyzer is further configured to generate an assessment descriptive of recommended alarms not included in the at least one alarm.

13. A method for analyzing a supervisory control and data acquisition (SCADA) system, the method comprising:
receiving a project file regarding the SCADA system configured to monitor an industrial process, the project file describing at least one first programmable device within the SCADA system and at least one value for at least one configuration setting for the at least one first programmable device;
identifying at least one analyzer from a plurality of analyzers based on the project file;
generating, with the at least one analyzer, an assessment of the SCADA system based on the project file, the assessment describing at least one capability of the SCADA system; and
providing the assessment to an external entity,
wherein the at least one analyzer includes a device analyzer configured to determine if the at least one first programmable device has an available resource capacity to execute a task assigned to the at least one first programmable device.

14. The method according to claim 13, wherein receiving the project file comprises receiving information descriptive of the available resource capacity of the at least one first programmable device and wherein generating the assessment comprises generating an assessment descriptive of the available resource capacity.

15. The method according to claim 13, wherein receiving the project file comprises receiving information descriptive of at least one data point that the at least one first programmable device is configured to transmit and wherein generating the assessment comprises generating an assessment descriptive of one or more data points not included in the at least one data point.

16. The method according to claim 15, wherein generating the assessment comprises generating an assessment descriptive of a history of values of the at least one data point that the system is configured to store.

17. The method according to claim 16, wherein generating the assessment comprises generating an assessment descriptive of a configuration of the system capable of storing the history.

18. The method according to claim 13, wherein receiving the project file comprises receiving information descriptive of instructions to be executed by the at least one first programmable device and wherein generating the assessment comprises generating an assessment descriptive of the instructions.

19. The method according to claim 13, wherein receiving the project file comprises receiving information descriptive of executable content available to a user and wherein generating the assessment comprises generating an assessment descriptive of security issues associated with the executable content.

20. A non-transitory computer readable medium having stored thereon sequences of instruction for analyzing a supervisory control and data acquisition (SCADA) system including instructions that will cause at least one processor to:
receive a project file regarding the SCADA system configured to monitor an industrial process, the project file describing at least one first programmable device within the SCADA system and at least one value for at least one configuration setting for the at least one first programmable device;
identify at least one analyzer from a plurality of analyzers based on the project file, the at least one analyzer being configured to generate an assessment of the SCADA system based on the project file, the assessment describing at least one capability of the SCADA system;
execute the at least one analyzer to generate the assessment of the SCADA system based on the project file; and
provide the assessment to an external entity, wherein the at least one analyzer includes a device analyzer configured to determine if the at least one first programmable device has an available resource capacity to execute a task assigned to the at least one first programmable device.

* * * * *